United States Patent Office 3,637,673
Patented Jan. 25, 1972

3,637,673
OPTICAL BLEACHING OF ORGANIC MATERIAL
Ichiro Okubo and Michihiro Tsujimoto, Tokyo, Japan, assignors to Mitsui Toatsu Chemicals, Inc., Tokyo, Japan
No Drawing. Filed Oct. 21, 1968, Ser. No. 769,429
Claims priority, application Japan, Oct. 26, 1967, 42/68,938
Int. Cl. C07d 55/04
U.S. Cl. 260—240.9    1 Claim

ABSTRACT OF THE DISCLOSURE

An optical bleaching agent for organic materials comprising as an effective ingredient a bistriazolyl styrene derivative expressed by the general formula

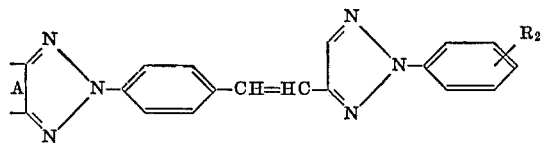

wherein A represents a benzene, naphthalene or acenaphthene nucleus, with the proviso that when A is a benzene or naphthalene nucleus, it may have an alkyl group, alkoxy group, acylamino group, sulphonic acid group, sulphonate group, or sulphonamide group as a substituent; $R_1$ represents a cyano group, sulphonic acid group, substituted or unsubstituted sulphonamide group, aryl sulphonate group, alkylsulphone group, carbamoyl group, or carboxylate group; and $R_2$ represents a hydrogen atom, halogen atom or methyl group.

---

This invention relates to a process for preparation of novel bistriazolyl styrene derivatives expressed by the general Formula I

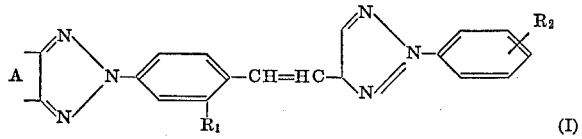

wherein A represents a benzene, naphthalene or acenaphthene nucleus, with the proviso that when A is benzene or naphthene nucleus, it may have an alkyl group, alkoxy group, acylamino group, sulphonic acid group, sulphonate group, or sulphonamide group as a substituent; $R_1$ represents a cyano group, sulphonic acid group, substituted or unsubstituted sulphonamide group, aryl sulphonate group, alkylsulphone group, carbamoyl group, or carboxylate group; and $R_2$ represents a hydrogen atom, halogen atom or methyl group, a process for optically bleaching organic materials with the use of said derivatives, and to optical bleaching agents comprising said derivatives as active ingredients.

The novel bistriazolyl styrene derivatives of the general Formula I have been quite unknown up to date. These compounds are remarkably fluorescent, and have excellent properties as optical bleaching agents. Hence, they are commercially very valuable.

Various synthetic resinous materials are employed as organic materials to be treated in accordance with this invention. They may be in the form of fibrous materials such as fibers, filaments, woven goods and knitted goods or shaped articles such as films, sheets and pellets. Especially, synthetic resinous materials of the polyester, polyamide, polyolefine, polyvinyl chloride, polystyrene, acetalised polyvinyl alcohol or polyacrylic type can be optically bleached with excellent results in accordance with this invention. Moreover, a very excellent fastness to light can be obtained by this process.

The novel bistriazolyl styrene derivatives of the general Formula I used in the process of optical bleaching of organic materials according to the invention can be easily prepared by diazotising 4-amino-β-[2'-aryl-oso-triazolyl-(4')]-styrene compounds, coupling the resulting diazonium compounds of the general Formula III with aryl amines of the general Formula IV which may form o-aminoazo compounds by azo-coupling, and oxidatively cyclising the obtained o-aminoazo compounds of the general Formula V to form a triazole ring at the 4-position of the styrene nucleus. This process is shown as follows:

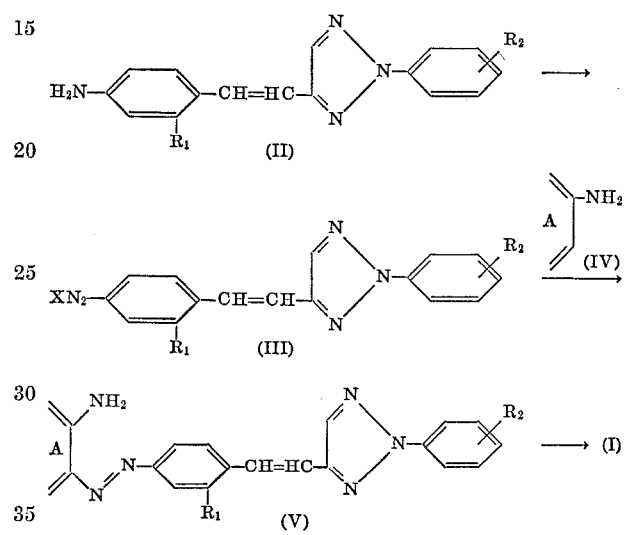

$R_1$ and $R_2$ in the foregoing Formulas II, III and V are the same as $R_1$ and $R_2$ in the general Formula I. A is the same as A in the general Formula I. X in the general Formula III represents an anionic radical in the diazonium compound. When the bistriazolyl styrene derivatives of the Formula I are sulphonic acids or carboxylic acids, it is advantageous to obtain them as salts of these acids.

When $R_1$ in the general Formula I is a sulphonic acid group, it is advantageous to synthesize a compound of the Formula I through a stage of an intermediate product in which $R_1$ has an aryl sulphonate group. When $R_1$ in the general Formula I is a substituted or unsubstituted sulphonamide group, a compound in which $R_1$ is a sulphonic acid group is converted in a customary manner into its sulphochloride, which may further be reacted with ammonia or an amine to thereby form a compound of the general Formula I. Reaction of said sulphochlorides with sodium phenolates gives aryl sulphonates.

The intermediates of the general Formula II used as the starting materials in the above-mentioned route of preparing the novel bistriazolyl styrene derivatives of the invention can be prepared by condensing 4-nitro-2-substituted toluenes of the general Formula VI with 2-aryl-oso-triazole-4-aldehydes of the general Formula VII, and reducing the nitro groups of the resulting 4-nitro-β-[2'-aryl-oso-triazolyl-(4')]-styrene compounds in a customary manner to thereby convert them into amino derivatives. This process is shown as follows:

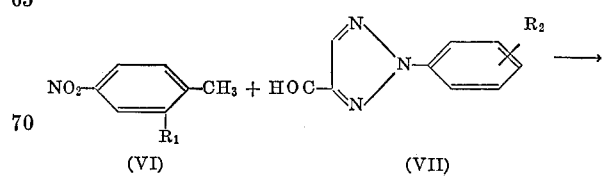

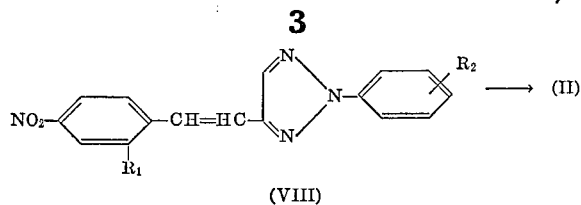

(VIII)

$R_1$ and $R_2$ in the foregoing Formulas VI, VII and VIII are the same as $R_1$ and $R_2$ of the general Formula I.

Examples of the aryl amines which participate in the coupling and are expressed by the general Formula IV are 1,3-phenylene diamine,
2-acetamino-4-aminotoluene,
1-methoxy-2,4-diaminobenzene,
2-methoxy-4-aminotoluene,
2-ethoxy-4-aminotoluene,
3,4-dimethylaniline,
3,4-dimethoxyaniline,
2-naphthylamine,
4-methoxy-1-naphthylamine,
4-methyl-1-naphthylamine,
6-methoxy-2-naphthylamine,
1-naphthylamine-4-sulphonic acid,
1-naphthylamine-5-sulphonic acid,
1-naphthylamine-4,8-disulphonic acid,
2-naphthylamine-1-sulphonic acid,
2-naphthylamine-6-sulphonic acid,
2-naphthylamine-3,6-disulphonic acid,
1-naphthylamine-4-sulphonamide,
1-naphthylamine-5-sulphonamide,
2-naphthylamine-6-sulphonamide,
1-naphthylamine-4-dimethyl sulphonamide,
1-naphthylamine-5-diethyl sulphonamide,
2-naphthylamine-6-diethyl sulphonamide,
2-naphthylamine-7-methyl sulphonamide,
1-naphthylamine-4-(γ-dimethylaminopropyl)-sulphonamide,
2-naphthylamine-6-(γ-dimethylaminopropyl)-sulphonamide, and
5-aminoacenaphthene.

As the 4-nitro-2-substituted toluenes of the general Formula VI, the following compounds can be cited, for instance:

4-nitro-2-cyanotoluene,
4-nitro-2-sulphamoyltoluene,
4-nitro-2-(N-ethyl)-sulphamoyltoluene,
4-nitro-2-(N,N-dimethyl)-sulphamoyltoluene,
4-nitro-2-[N-(β-hydroxyethyl)]-sulphamoyltoluene,
4-nitro-2-(N-benzyl)-sulphamoyl-toluene,
4-nitro-(N-phenyl)-sulphamoyltoluene,
4-nitro-2-methylsulphonyltoluene,
4-nitro-2-ethylsulphonyltoluene,
4-nitro-2-carbamoyltoluene,
4-nitro-2-(n-carbobutoxy)-toluene and
4-nitro-2-sulphotoluene phenyl ester.

Examples of the 2-aryl-oso-triazole-4-aldehydes of the general Formula VII are 2-phenyl-oso-triazole-4-aldehyde, 2-(4'-tolyl)-oso-triazole-4-aldehyde, 2 - (3'-tolyl)-oso-triazole-4-aldehyde, 2-(4'-chlorophenyl)-oso-triazole-4-aldehyde, and 2-(3'-chlorophenyl)-oso-triazole-4-aldehyde.

The novel bistriazolyl styrene derivatives employed in the optical bleaching of organic materials in accordance with this invention are given in Table 1 below. It should be understood that the exemplification does not restrict the chemical structures of the novel bistriazolyl styrene derivatives employed in the invention. Table 1 describes the melting points of these compounds, but as regards sodium sulphonate, the table indicates the maximum wavelength of the fluorescence spectrum shown in the ethanol solution thereof instead of the melting point because it has a high melting point.

TABLE 1

| Compound No. | Structural formula | Melting point (° C.) or maximum wavelength in fluorescence spectrum (mμ) |
|---|---|---|
| 1 | | 244 to 245° C. |
| 2 | | 265 to 266° C. |
| 3 | | 242 to 243° C. |
| 4 | | >300° C. |

TABLE 1.—Continued

| Compound No. | Structural formula | Melting point (° C.) or maximum wavelength in fluorescence spectrum (mμ) |
|---|---|---|
| 5 | (structure) | 235 to 236° C. |
| 6 | (structure) | 220 to 221° C. |
| 7 | (structure) | 226 to 227° C. |
| 8 | (structure) | 239 to 239.5° C. |
| 9 | (structure) | 287 to 288.5° C. |
| 10 | (structure) | 230.5 to 231° C. |
| 11 | (structure) | 171 to 172° C. |
| 12 | (structure) | 279.5 to 280.5° C. |
| 13 | (structure) | 223.5 to 224.5° C. |

TABLE 1—Continued

| Compound No. | Structural formula | Melting point (° C.) or maximum wavelength in fluorescence spectrum (mμ) |
|---|---|---|
| 14 | (structure with $SO_2NHCH_2$-phenyl) | 229.5 to 230.5° C. |
| 15 | (structure with $SO_2NH$-phenyl) | 264 to 265° C. |
| 16 | (structure with $SO_2NHC_2H_4OH$) | 283.5 to 284.5° C. |
| 17 | (structure with $SO_2NH(CH_2)_3N(C_2H_5)_2$) | 159.5 to 161° C. |
| 18 | (structure with $SO_2C_2H_5$) | 221.5 to 222.5° C. |
| 19 | (structure with $(CH_3)_2NO_2S$- and $SO_2N(CH_3)_2$) | 261 to 262° C. |
| 20 | (structure with $(C_2H_5)_2NO_2S$- and $CN$) | 255 to 265° C. |
| 21 | (structure with $(CH_3)_2N(CH_2)_3NHO_2S$- and $SO_2NH(CH_2)_3N(CH_3)_2$) | 161.5 to 163° C. |

TABLE 1—Continued

| Compound No. | Structural formula | Melting point (° C.) or maximum wavelength in fluorescence spectrum (mµ) |
|---|---|---|
| 22 | | 211 to 212° C. |
| 23 | | 170 to 171° C. |
| 24 | | 300° C. |
| 25 | | 430 mµ. |
| 26 | | 419 mµ. |
| 27 | | 430 mµ. |
| 28 | | 424 mµ. |
| 29 | | 407, 427 mµ. |
| 30 | | 452 mµ. |

TABLE 1—Continued

| Compound No. | Structural formula | Melting point (° C.) or maximum wavelength in fluorescence spectrum (mµ) |
| --- | --- | --- |
| 31 | [structure] | 422 mµ; |
| 32 | [structure] | 433 mµ; |
| 33 | [structure] | 196.5 to 197.5° C. |
| 34 | [structure] | 214 to 214.5° C. |
| 35 | [structure] | 193 to 195° C.[1] |

[1] Decomposition.

According to the invention, a wide variety of organic materials can be optically bleached with the use of the novel bistriazoyl styrene derivatives of the general Formula I. If the organic materials are synthetic fibers, they may be treated with good results in an aqueous medium containing the novel bistriazolyl styrene compound in dispersed state. If desired, a suitable surface active agent may be added to the treating liquid to advantage. Suitable surfactants used in such a case include anionic surfactants such as sodium alkylbenzene sulphonates, condensation products of naphthalenesulphonic acid with formaldehyde and sulphuric esters of higher alcohols and non-ionic surfactants such as polyoxyethylene alkyl ethers and polyoxyethylene aryl ethers. In the treatment of polyester fibers, the addition of a carrier such as trichlorobenzene and salicyclic esters to the treating bath may facilitate the bleaching effect. When it is desired to bleach polyester fibers in the form of fabrics, it is particularly advantageous to deposit the novel bistriazolyl styrene derivative onto the fabrics from an aqueous medium containing a surfactant and subjecting them to a dry-heating treatment in accordance with the so-called thermosol method.

The treating temperature employed in the bleaching of synthetic fibers in accordance with the invention is preferably between 50° C. and 130° C. in the case of exhaustion method in which the bleaching is effected in an aqueous medium, and especially effectively between 180° C. and 240° C. in the case of dry-heating treatment of polyester fibers.

It is possible to bleach the shaped articles of organic materials optically by adding the novel bistriazolyl styrene derivatives of the general Formula I before or during the shaping operation. It is also possible to add these compounds into synthetic resin materials during the process of manufacturing, for instance, in a polymerising step or condensing step. Optically bleached fibers can be prepared by spinning a molten spinning liquid to which these compounds have been added in a dissolved or finely dispersed state prior to the spinning.

In the optical bleaching of organic materials in accordance with the invention, an amount of the novel bis-triazolyl styrene derivative of the Formula I based on the material to be treated may be within the range of 0.01% to 1.0% of the weight of the material.

The invention will further be described by the following examples which are presented only for illustrative purposes and are not intended to be limitative. All parts appearing in the examples are by weight.

EXAMPLE 1

One part of a compound of the formula

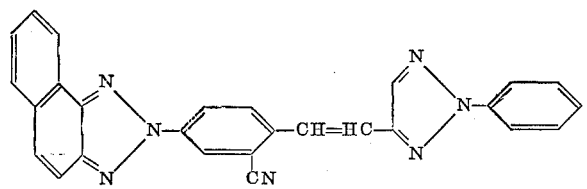

was well mixed with 2 parts of a polyoxyethylene aryl ether type surfactant, and the mixture was diluted with water until the amount reached 10 parts of the resulting dispersed solution was added to 5000 parts of a water bath containing 10 parts of a sulphuric ester of a higher alcohol as a surfactant. One hundred parts of a polyester fiber was put into this bath, and treated for 60 minutes at 120° C. The treated fiber was washed with water, and dried. A remarkable optical bleaching effect was imparted to the fiber.

EXAMPLE 2

A compound (0.1 part) of the formula

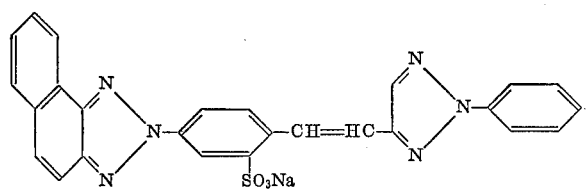

was added to 5000 parts of a water bath containing 10 parts of a sulphuric ester of a higher alcohol as a surfactant. One hundred parts of a polyamide fiber was put into the bath, and treated for 40 minutes at 100° C. The treated fiber was washed with water, and dried. A remarkable optical bleaching effect was imparted to the fiber.

EXAMPLE 3

With the use of a compound expressed by

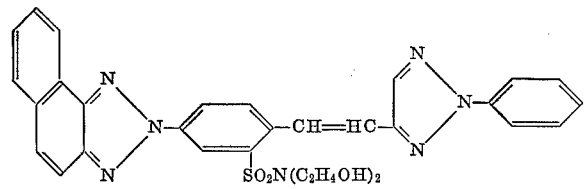

an acetate fiber was treated for 60 minutes at 80° C. A remarkable optical bleaching effect was obtained.

EXAMPLE 4

A compound (0.1 part) of the formula

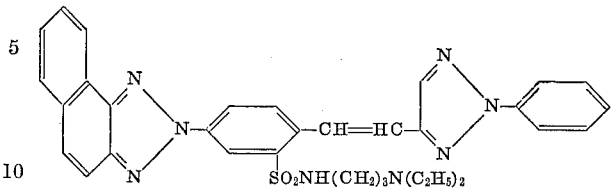

was added to 5000 parts of a water bath containing 10 parts of a sulphuric ester of a higher alcohol as a surfactant, 15 parts of sodium chlorite and 15 parts of oxalic acid. One hundred parts of a polyacrylic fiber was put into this bath, and treated for 60 minutes at 100° C. The treated fiber was thoroughly washed with water, and dried. A remarkable optical bleaching effect was imparted to the fiber.

EXAMPLE 5

A dispersed solution was prepared in the same manner as in Example 1 with the use of a compound expressed by

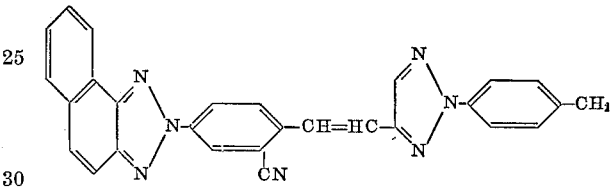

A polyester fabric was immersed into 1000 parts of an aqueous treating liquid containing 20 parts of the resulting dispersed solution and 2 parts of a polyoxyethylene alkyl ether type surfactant, and was impregnated with the bath liquid at a take-up of 40–50%. The fabric was then dried in air, treated for one minute at 220° C., washed with a dilute surfactant bath, washed with water, and dried. A remarkable optical bleaching effect was obtained.

EXAMPLE 6

A compound (0.1 part) expressed by

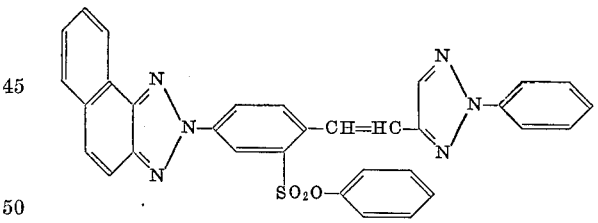

was uniformly mixed with 100 parts of polyester granules consisting of polyethylene terephthalate. The mixture was pressed for 4 minutes between metal plates heated to a temperature of 260° C. to form a film having an thickness of about 0.05 mm. The obtained film exhibited an appearance giving a remarkable whiteness as compared with the film prepared in the same manner but not containing the above-mentioned compound.

EXAMPLE 7

The mixture of Example 6 was molten at 260 to 290° C., and extruded through a spinneret. A remarkably bleached polyester fiber was obtained.

EXAMPLE 8

A compound (0.1 part) expressed by

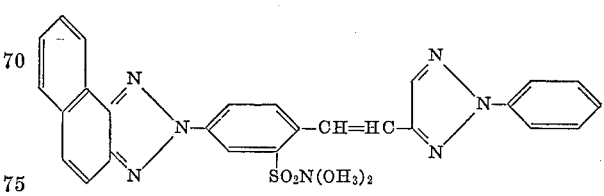

was added to a mixture of 100 parts of dimethyl terephthalate, 62 parts of ethylene glycol, 0.015 part of zinc acetate and 0.02 part of antimony trioxide, and in the absence of air, the resulting mixture was heated to a temperature of 220° C. over a period of 4 hours, followed by removal of the formed methanol by distillation. A suspension of one part of titanium oxide in one part of ethylene glycol was added thereto, and well stirred. The resulting mixture was heated for 4 hours at reduced pressure, and heated to 275° C. to complete the polycondensation reaction. The so obtained polymer was molten, and extruded through a spinneret in the same manner as in Example 7. A polyester fiber having an improved appearance was obtained.

EXAMPLE 9

The compound (0.05 part) of Example 5 was mixed with 100 parts of polypropylene granules containing a suitable stabiliser, and the resulting mixture was molten at 200° C. in a screw press. It was extruded from the die head of the press in the form of a rod at a rate of 5 g. per minute. The so obtained pellet exhibited a remarkably white appearance as compared with the pellet prepared in the same manner as above but not containing the said compound.

EXAMPLE 10

A mixture consisting of 0.1 part of a compound expressed by

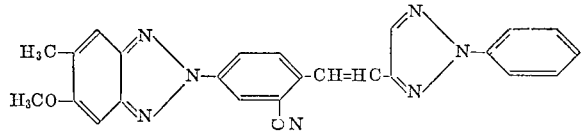

50 parts of polyvinyl chloride and 50 parts of dioctyl phthalate was kneaded for 10 minutes at 150° C., and then pressed for 5 minutes between metal plates heated to a temperature of 160° C. to form a film having a thickness of about 0.5 mm. The so obtained film exhibited a remarkably white appearance, as compared with the film prepared in the same manner without using the said compound.

The following examples illustrate the preparation of the novel bistriazolyl styrene derivatives and their intermediates employed in the invention.

EXAMPLE 11

Preparation of 4-nitro-2-cyano-$\beta$-[2'-phenyl-oso-triazolyl-(4')]-styrene

A mixture consisting of 22 parts of 2-phenyl-oso-triazole-4-aldehyde, 20 parts of 4-nitro-2-cyanotoluene, 1.5 parts of piperidine and 2 parts of pyridine was reacted at 140–145° C. while stirring. Water formed during this time was removed out of the system by distillation. Fifty parts of methyl Cellosolve was added while hot, and the mixture was cooled while stirring well. With further addition of 40 parts of methanol, the system was left to stand overnight at room temperature. The yellow precipitate separated was recovered by filtration, washed with cold methanol, and dried. By recrystallisation from butyl Cellosolve, a product in the form of brilliant yellow prismatic crystals (melting point, 182–184° C.) was obtained. In the same manner, the following intermediates were obtained.

2-sulphonic acid phenyl ester: yellow prismatic crystals (M.P. 182–184° C.)

2-sulphodimethylamide: yellow pillar-like crystals (M.P. 208–210° C.)

2-ethylsulphone: yellow pillar-like crystals (M.P. 204–205° C.)

EXAMPLE 12

Preparation of 4-amino-2-cyano-$\beta$-(2'-phenyl-oso-triazolyl)-styrene

A mixture consisting of 12 parts of iron powder, 0.2 part of concentrated hydrochloric acid and 10 parts of water was heated for one hour while strongly stirring it. With the addition of 20 parts of 4-nitro-2-cyano-$\beta$-[2'-phenyl-iso-triazolyl-(4')]-styrene and 100 parts of butyl Cellosolve, the mixture was boiled and stirred for 6 hours under reflux. It was made alkaline by adding a 40% caustic soda solution while hot, and then the iron residue was hot filtered, and the filtrate was washed with a small amount of hot butyl Cellosolve. The washing liquid was gathered with the mother liquor, and they were poured into five times their weight of water to form a precipitate. The precipitate was allowed to be cooled overnight, filtered, washed with water, and dried. There was obtained a product in the form of yellow pillar-like crystals (melting point, 173.5–175° C.).

EXAMPLE 13

Preparation of sodium 4-nitro-$\beta$-[2'-phenyl-oso-triazolyl-(4')]-styrene-2-sulphonate A phenyl ester of 4-nitro-$\beta$-[2'-phenyl-oso-triazolyl-(4')]-styrene-2-sulphonic acid was boiled in three times its weight of methyl Cellosolve while stirring under reflux followed by addition of a 40% caustic soda solution in an amount slightly in excess over a calculated amount. The nitro compound was once dissolved, but in a while, was precipitated as yellow matter. The boiling was continued for one hour with occasional addition of water. The system was diluted with further addition of water, and sodium chloride was added while hot. The formed sodium sulphonate was salted out. After cooling, the formed yellow precipitate was filtered, and washed with saline water to give a paste-like sodium sulphonate. It was readily converted into an amino compound by reduction with iron powder and hydrochloric acid in an aqueous medium.

EXAMPLE 14

Preparation of 4-[2''-aminonaphthyl-(1'')]-azo-$\beta$-[2'-phenyl-oso-triazolyl-(4')]-styrene 14.4 parts of 4-amino-2-cyano-$\beta$-[2'-phenyl-oso-triazolyl-(4')]-styrene, 10 parts of concentrated hydrochloric acid and 10 parts of water were grounded to give a paste-like mixture. By the addition of ice water, it was maintained at a temperature of 0 to 5° C., and diazotised by addition of 3.5 parts of sodium nitrite. At the end of diazotisation, excess nitrous acid was removed with the use of sulphamic acid. Separately, an emulsion was prepared by dissolving 7.3 parts of 2-naphthylamine into a small amount of hot glacial acetic acid, and pouring the solution into a great quantity of water. The emulsion was maintained at a temperature of 10 to 15° C., and the diazotised liquid mentioned above was added thereto. With further addition of 7 parts of crystalline sodium acetate, the mixture was subjected to stirring for several hours. The formed red azo compound was filtered, washed with cold water, and compressed. The obtained product can be derived to bistriazolyl compound as shown in Example 15 coming next.

EXAMPLE 15

Preparation of 4-[naphtho-1''', 2''', 4'', 5''-triazolyl-(2'')]-2 - cyano-$\beta$-[2'-phenyl-oso-triazolyl(4')]-styrene (compound 1 in Table 1)

The azo compound obtained in Example 14, 22 parts of copper acetate and 100 parts of pyridine were boiled and stirred for 6 hours under reflux. After cooling, the product was recovered by filtration, and was boiled in 100 parts of a 3% aqueous solution of sodium sulphide. The precipitate was again recovered by filtration, washed with water and dried. The product was dissolved by heating into a mixture of 150 parts of o-dichlorobenzene and 30 parts of glacial acetic acid, and after addition of 10–20 parts of granular tin, the solution was boiled for 3 hours, followed by hot filtration. The mother liquor was allowed to be cooled. The precipitated yellow crystal was filtered, washed with methanol, and dried. There was obtained a product in the form of yellow finely needle-like crystal (melting point, 244–245° C.). The product exhibited a maximum absorption wavelength of 372 mμ on the ultraviolet absorption spectrum (methanol), and a maximum wavelength of 408 mμ and 427 mμ on the fluorescence spectrum (benzene).

EXAMPLE 16

Preparation of 4-[naphtho-1''', 2''', 4'', 5''-triazolyl-(2'')-β - [2' - phenyl - oso - triazolyl-(4')]-styrene-2-sulphoanilide (compound 15 in Table 1)

Five parts of sodium 4-[naphtho-1''', 2''', 4'', 5''-triazolyl - (2'')] - β - [1-phenyl-oso-triazolyl-(4')]-styrene-2-sulphonate (compound 20 in Table 1), 30 parts of phosphorus oxychloride and 2.5 parts of phosphorus pentachloride were boiled for three hours while stirring. The yellow porridge-like reaction product was discharged into ice water, and well stirred to decompose the residual phosphorus oxychloride and phosphorus pentachloride. There was obtained a yellow powdery sulphochloride. It was filtered, and dried at room temperature under reduced pressure. A solution of this product in benzene showed almost no fluorescence. One part of the so obtained sulphochloride was dissolved into 10 parts of aniline while heating. After cooling, the precipitated crystal was filtered, and washed with methanol to give a fine yellow powdery sulphoanilide. Recrystallisation of it from o-dichlorobenzene gave fine yellow pillar-like crystals (melting point, 264–265° C.). The obtained product had a maximum absorption wavelength of 369 mμ on the ultraviolet absorption spectrum (methanol) and a maximum wavelength of 410 mμ and 431.5 mμ on the fluorescence spectrum (benzene).

When the foregoing procedure was repeated except that a mixture of sodium phenolate and phenol was used instead of aniline, phenyl ester (compound 11 in Table 1) was obtained. By using γ-diethylaminopropylamine instead of the aniline in the foregoing procedure, N-(γ-diethylaminopropyl)-sulphonamide (compound 17 in Table 1) was obtained.

We claim:
1. A bistriazolyl styrene derivative of the formula

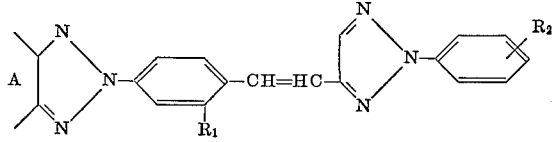

wherein A represents a benzene, naphthalene or acenaphthene nucleus, with the proviso that when A is a benzene or naphthalene nucleus, said benzene or naphthalene nucleus may be substituted with a lower alkyl group, lower alkoxy group, acetylamino group, sulphonic acid group, sulphonate group, or sulphonamide group; $R_1$ represents a cyano group, sulphonic acid group, sulphonamide group, lower alkyl-, phenyl-, benzyl-, hydroxy lower alkyl-, lower alkylaminoalkyl, quaternary salt- or morpholino-substituted sulphonamide group, phenyl sulphonate group, lower alkylsulphone group, carbamoyl group, or carboxylate group; and $R_2$ represents a hydrogen atom, halogen atom, or methyl group.

References Cited
FOREIGN PATENTS
829,788    3/1960    Great Britain _____ 260—240

OTHER REFERENCES

Chemical Abstracts, vol. 65, cols. 2399 to 2400 (1966) (abstract of Belgian Pat. 665,688).

JOHN D. RANDOLPH, Primary Examiner

U.S. Cl. X.R.

117—33.5 T; 252—152, 301.2 W; 260—73, 75, 78, 89.5, 92.8, 93.7, 141, 157, 308